(No Model.)
J. W CAIN.
FRUIT GATHERER.
No. 435,206. Patented Aug. 26, 1890.
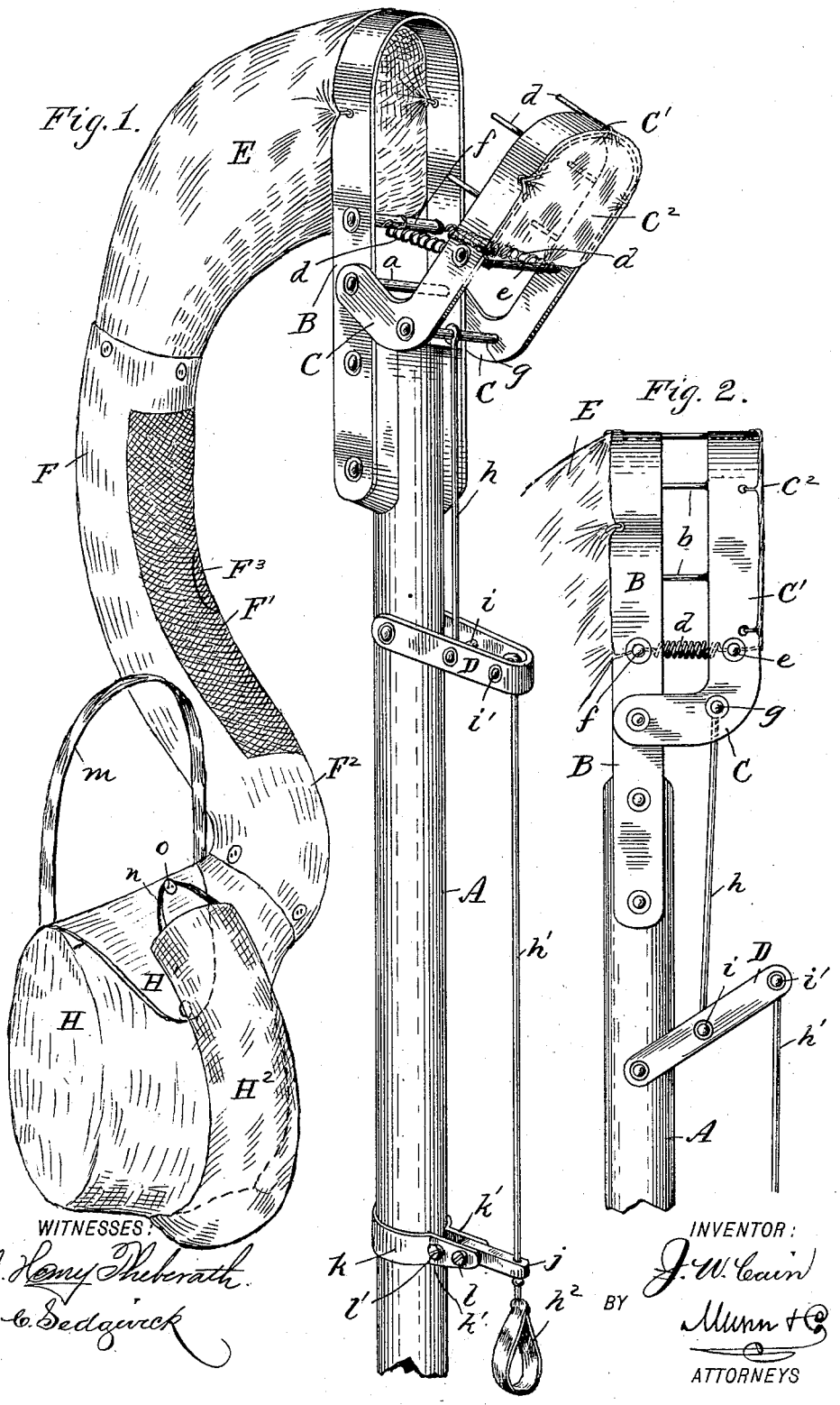

UNITED STATES PATENT OFFICE.

JOHN W. CAIN, OF RUSK, WEST VIRGINIA.

FRUIT-GATHERER.

SPECIFICATION forming part of Letters Patent No. 435,206, dated August 26, 1890.

Application filed March 19, 1890. Serial No. 344,444. (No model.)

*To all whom it may concern:*

Be it known that I, JOHN W. CAIN, of Rusk, in the county of Ritchie and State of West Virginia, have invented a new and Improved Fruit-Picker, of which the following is a full, clear, and exact description.

My invention relates to improvements in fruit-pickers; and the object of my invention is to provide a simple, convenient, and efficient device by means of which a person may stand upon the ground and pick fruit from the tops of the trees.

To this end my invention consists in a fruit-picker constructed substantially as hereinafter described and claimed.

Reference is to be had to the accompanying drawings, forming a part of this specification, in which similar letters of reference indicate corresponding parts in both the figures.

Figure 1 is a perspective view of the device with the jaw open, and Fig. 2 is a detail view showing the jaw in closed position.

To one end of a suitable handle A is fixed a loop B, which is made, preferably, of metal, and which is firmly attached to the handle, so as to project beyond the end of the same. Pivoted to the loop B, by the rod $a$, is an angular jaw C, having an upwardly-extending portion C', which corresponds in size and shape to the loop B, and which when closed will be parallel with the loop, it being prevented from closing upon the loop by the pins $b$, which project from the inner edge of the jaw C and impinge upon the loop B, so that the tender branches of the trees will not be nipped between the jaw and the loop.

The jaw C is provided with an upper covering $C^2$, and is held normally in closed position, as shown in Fig. 2, by the spiral springs $d$, which extend from a cross-bar $e$ of the part C' to the cross-bar $f$ of the loop B. A rod $g$ extends across the elbow of the jaw C, to which a rod $h$ is attached, said rod extending parallel with the handle A, and having its lower end affixed to the pin $i$ of the arm D, which is pivoted to the handle A and extends laterally therefrom.

Near the outer end of the arm D is another pin $i'$, from which a rod $h'$ extends parallel with the handle through the brace $j$, and terminates in a hand-loop $h^2$. The brace $j$ projects from between the ears $k'$ of the clasp $k$, the brace being held between the ears by the screw $l$, and the clasp being tightened upon the handle by the screw $l'$, which extends through the ears. Only one clasp $k$ and brace $j$ is needed; but if the handle A is very long several arms D may be placed thereon.

Extending from the lower side of the loop B and suitably attached thereto is a bag E, which terminates in a spout F, which is suitably attached to a receiving-sack H. The spout F has a netting F' in one side, through which the fruit may be examined, an elbow $F^2$, in which the fruit may stop, and a vertical opening $F^3$, through which a particular fruit may be extracted from the elbow. The bag E, spout F, and sack H should be made separable, as shown.

The sack H is provided with a strap $m$, by which it may be suspended from the neck and shoulders of the operator, a flap H', by which the upper opening of the sack may be closed, and a terminal spout $H^2$, through which the fruit may be emptied from the sack into another receptacle. The terminal end of the spout is provided with a loop $n$, which may be hooked upon a button $o$ on the top of the sack while the sack is being filled, to prevent the fruit from dropping through the spout.

The device is operated as follows: The operator places the strap $m$ around his neck, thrusts a hand through the loop $h^2$, and grasps the handle A with both hands. He then pulls upon the loop $h^2$, and this will pull the rod $h'$, which will swing the arm D, actuate the rod $h$, and cause the jaw C to swing open upon the rod $a$, as shown in Fig. 1. The operator then places the loop B beneath the fruit to be plucked and loosens his hold on the loop $h^2$, when the springs $d$ will close the part C' of the jaw C upon the loop B and over the fruit to be plucked, when by slightly dropping the handle A the fruit will be pulled from the limb and will roll through the bag E and spout F into the sack H.

It is obvious that a wire or cord may be substituted for the rods $h$ and $h'$, and that any suitable spring may be used instead of the springs $d$ to hold the jaws C in closed position.

Having thus described my invention, I claim as new and desire to secure by Letters Patent—

1. In a fruit-picker, the combination, with the handle A, the loop B, secured to the handle and projecting above the same, and the bag E, secured to the loop, of the angular jaw C, pivoted to the said loop and provided with the pins $b$, projecting from its inner edge, and with the covering $C^2$, the spring $d$ for holding the jaw normally closed, the arm D, pivoted to the handle, the rod $h$, connected to the arm and to the jaw, and rod $h'$, connected to the outer end of the said arm D, substantially as described.

2. In a fruit-picker, the combination, with the handle A, the loop B, secured to the handle, and the bag E, secured to the loop of the angular jaw C, pivoted to the loop and provided with the pins $b$, and the covering $C^2$, the spring $d$ for holding the jaw normally closed, the arm D, pivoted to the handle, the rod $h$, connected to the jaw and arm, the brace $j$, projecting from the handle below the arm D, and the rod $h'$, secured to the outer end of the arm D, passed through the brace $j$, and provided with the hand-loop $h^2$, substantially as herein shown and described.

3. A fruit-picker comprising the handle A, the loop B, secured to the handle, the bag E, secured to the loop and terminating in the spout F, the receiving-sack H, to which the spout is connected, provided with the strap $m$, and the terminal spout $H^2$, the pivoted and spring-pressed jaw C, provided with the pins $b$, the covering $C^2$, and means for opening said jaw, substantially as herein shown and described.

4. In a fruit-picker, the combination, with the bag E, attached to the picking mechanism, as shown, of the spout F, having netting F', elbow $F^2$, and opening $F^3$ therein, substantially as described.

JOHN W. CAIN.

Witnesses:
F. W. REITZ,
J. B. HICKMAN.